United States Patent [19]

Broadus

[11] Patent Number: 4,648,458
[45] Date of Patent: Mar. 10, 1987

[54] PROCESS FOR ELIMINATING STATIC VENTING OF VAPOR-DOMINATED GEOTHERMAL WELLS

[75] Inventor: John G. Broadus, Los Angeles, Calif.

[73] Assignee: Union Oil Company of California, Los Angeles, Calif.

[21] Appl. No.: 750,328

[22] Filed: Jun. 28, 1985

[51] Int. Cl.⁴ .................. E21B 43/12; E21B 47/00
[52] U.S. Cl. .................... 166/370; 166/52; 166/66; 166/91; 166/95; 166/250
[58] Field of Search ........... 166/52, 66, 75.1, 91, 166/95, 245, 250, 263, 369, 370; 60/641.2, 641.3, 641.4, 641.5

[56] References Cited

U.S. PATENT DOCUMENTS

| | | | |
|---|---|---|---|
| 782,681 | 2/1905 | Moser | 166/52 |
| 962,009 | 6/1910 | Dinsmoor | 166/52 |
| 2,637,531 | 5/1953 | Davidson | 166/52 X |
| 4,022,025 | 5/1977 | Greene | 60/641.2 |
| 4,199,028 | 4/1980 | Caughey | 166/370 |
| 4,248,305 | 2/1981 | Scarbrough et al. | 166/52 X |
| 4,407,366 | 10/1983 | Lieffers et al. | 166/250 |
| 4,542,625 | 9/1985 | Bronicki | 60/641.2 |

*Primary Examiner*—George A. Suchfield
*Attorney, Agent, or Firm*—Dean Sandford; Gregory F. Wirzbicki; June M. Bostich

[57] ABSTRACT

A method and apparatus for eliminating the static venting of shut-in geothermal wells producing from vapor-dominated geothermal formations comprising providing a closed system means for interwell flow of geothermal vapors from higher pressured wells to lower pressured wells so that the flow of geothermal vapors between the wells interconnected by said flow prevents accumulation of condensate and non-condensable vapors in said wellbores. Usually between 2 and about 15 completed geothermal wellbores in the same formation are connected in interwell flow.

19 Claims, 1 Drawing Figure

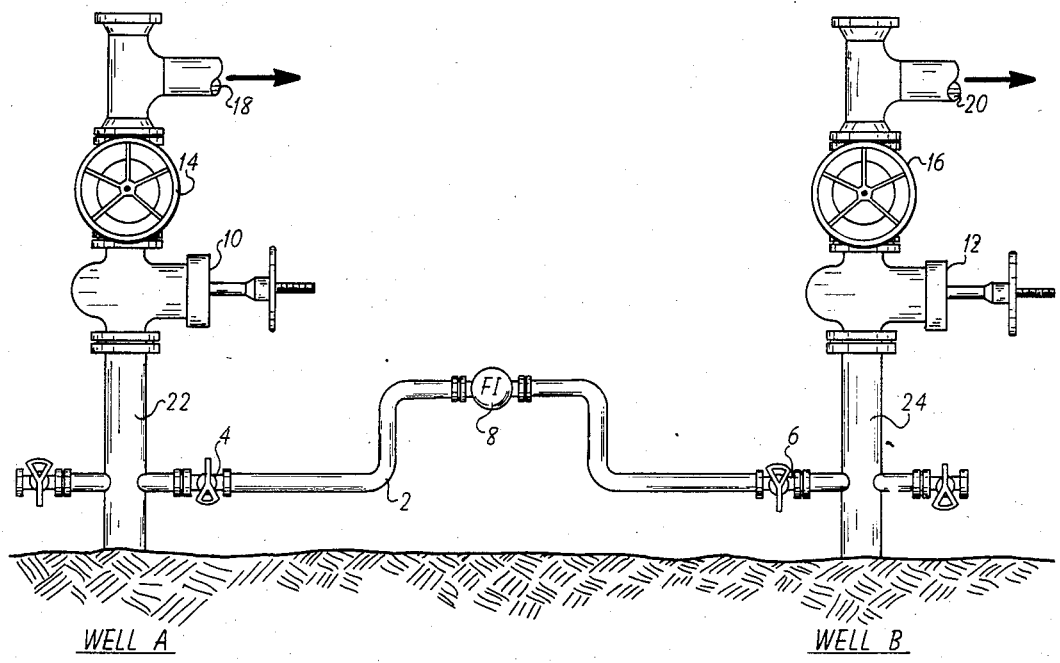

PROCESS FOR ELIMINATING STATIC VENTING OF VAPOR-DOMINATED GEOTHERMAL WELLS

BACKGROUND OF THE INVENTION

This invention relates generally to the field of geothermal steam production and more particularly to methods for shutting-in completed, but temporarily unused, geothermal steam wells.

Large subterranean reservoirs of naturally-occurring steam and/or hot aqueous liquid can be found in many regions of the world. Such reservoirs of geothermal stream and water or brine are particularly prevalent in regions where the thermal gradient near the earth's surface is abnormally high, as in regions of volcanic, geyser and fumarole activity, for example, along the rim of the Pacific Ocean.

In some areas, where readily available and conveniently located, geothermal steam and water or brine have for some time been advantageously used for therapeutic purposes, industrial processes and direct heating. Although there is current interest in further developing geothermal resources for these purposes, the principal effort has more recently been directed towards developing geothermal resources for producing electric power, the use of which is far less site-restricted than is the more direct use of geothermal fluids for the above-mentioned purposes. In particular, increases in hydrocarbon fuel costs and actual or threatened shortages of hydrocarbon fuels have greatly heightened interest in developing alternative fuel sources, including the use of geothermal fluids for electric power generation.

General techniques are known whereby geothermal fluids can be used to generate electric power. For example, geothermal steam can be used in substantially the same manner as boiler-generated steam to drive a steam turbine/electric generator combination. Pressurized geothermal water or brine, at a temperature above about 400° F., can be flashed to a lower pressure to extract steam which is then used to drive a steam turbine and generator. Lower temperature geothermal water or brine can be used in a closed loop binary system to vaporize a working fluid, the resulting vapor being used to drive a gas turbine and generator.

Use of geothermal steam for production of electric power is the most direct geothermal application and is therefore preferred, being generally easier and less costly than geothermal water or brine for power generation. Consequently, although commercially usable sources of geothermal steam are estimated to be only about one fifth as prevalent as those of geothermal water or brine, considerable effort has been and is being directed towards developing new, or expanding existing, geothermal steam power plants. As a point of reference, an estimated five percent of the electric power generated in California is now being geothermally generated at The Geysers.

Continued development of geothermal steam for electric power production, in such locations as The Geysers, requires the building of new power plants and annual drilling of many geothermal steam wells for providing steam to these new power plants. By way of illustration, since about 20 pounds of geothermal steam is, on the average, required for each kilowatt-hour of electric power produced, a typical 100 megawatt geothermal steam power plant requires about two million pounds of geothermal steam per hour. As good geothermal steam wells usually produce between about 150,000 and 200,000 pounds of steam per hour, each such typical geothermal steam power plant requires between about 10 and 15 geothermal steam wells for supplying steam.

Most geothermal steam wells require extensive drilling times and relatively high costs before they can be put into production. The high well drilling cost and comparatively long drilling time reflect the severe problems often encountered in drilling geothermal steam wells. The problems include the penetration of difficult geological formations, high well temperatures (typically about or above 500° F.), corrosive and abrasive characteristics of the air drilling process normally used in combination with the hot steam encountered, and the frequently remote and poorly accessible drill site locations.

Because 10 to 15 geothermal steam wells are typically required for each new geothermal steam power plant involving high drilling costs and long drilling times, the drilling operations are usually spread over several years, for example, over the 3 to 5 year construction time of the related power plant. Although a protracted well drilling operation of this nature is advantageous from standpoints of capital outlay and optimum utilization of drilling equipment, completed geothermal steam wells must stand idle for long periods of time awaiting completion of the full complement necessary to make the power plant, typically at least about a year and sometimes as long as four years. Problems are thereby created, particularly in keeping the wells in operational condition without substantial steam loss or violation of air pollution standards that arise from inherent geothermal steam characteristics.

Typically geothermal steam contains noxious gases that contribute to air pollution if vented to the atmosphere. Especially, the carbon dioxide, hydrogen sulfide and ammonia present in geothermal steam cause pollution when vented to the atmosphere and corrode the wellbore when steam condensate forms under conditions of shut-in.

Moreover, unvented static wells, especially those shut-in for more than twelve hours, develop high levels of hydrogen sulfide so that all static, unvented wells must be considered hazardous to work crews charged with the responsibility of initiating work upon the wells. Any cold wellhead is, therefore, to be considered extremely dangerous if opened up, or even if a fitting is accidentally broken off.

The bottom 2,000 to 3,000 feet of most geothermal steam wells in the steam-producing zone are ordinarily uncased, or "barefoot," to enable high steam extraction rates necessary for efficient energy production. When geothermal steam wells of this type are shut-in after completion and before use, so as to conserve steam and prevent air pollution, steam entering the lower, uncased well region from the surrounding formation rises in the borehole and condenses in cooler, upper borehole regions. As the resulting condensate flows back down the borehole, rocks and other debris along the uncased well region are fractured, loosened, and washed down into the bottom, steam production zone. These fallen rocks and debris, as well as the condensate itself, soon fill the steam-producing zone and "kill" the well. Before being later operatively connected to a power plant, the well requires reworking with a drilling rig at a typical cost of about $150,000 or more per well.

An additional problem results when carbon dioxide gas present in geothermal steam dissolves in the condensate that accumulates in a shut-in well. During normal production, acidic carbon-dioxide-enriched condensate cannot form due to the relatively low partial pressure of carbon dioxide in the steam, the low solubility of carbon dioxide at high temperature, and the pH buffering action of the ammonia present. However, carbon dioxide is readily soluble in hot water so that the head of condensate which forms in a totally static well becomes sufficiently acidic to result in damaged wellhead piping and equipment.

To avoid the high costs associated with reconditioning steam wells, most completed, but idle, geothermal steam wells have heretofore continuously vented an amount of geothermal steam sufficient to prevent well damage by steam condensation in the well. That is, sufficient steam has been vented from the wellhead of idle steam wells to prevent accumulation of condensate and non-condensable vapors in the wellbores. The amount of geothermal steam required for this purpose, of course, varies from well to well and according to the quality of the steam, but has been found to be typically between about 200 and 30,000 pounds per hour.

Venting of steam from geothermal wells to prevent condensation damage, although usually satisfactory for its intended purpose, not only wastes steam but, more importantly, causes air pollution problems which in many areas threaten its continued practice. Hydrogen sulfide is virtually always present in geothermal steam due, at least in part, it is believed, to action of anaerobic bacteria on sulfides naturally present in the ground. The hydrogen sulfide concentration of the vented geothermal steam is typically in a range of between about 40 and 1,000 parts per million, which is usually higher than the point source hydrogen sulfide emission standards of between about 1 and 4.4 pounds per hour per vent applicable in many locations.

Although such strict hydrogen sulfide emission standards have not been uniformly enforced in the past, as the number of geothermal steam wells drilled increases and their intrusion into populated and/or environmentally protected localities grows, more rigorous enforcement of these emission standards is virtually certain. The expected result is that venting of geothermal steam wells to prevent condensation damage may soon be prohibited in many areas unless costly hydrogen sulfide abatement processes are provided.

Similar strict hydrogen sulfide emission standards are also usually applied to "used" steam discharged into the atmosphere from operational geothermal power plants and to the large scale venting, or "stacking," of geothermal steam during brief periods of power plant shutdown or slowdown. However, because of the large amounts of steam and hydrogen sulfide involved and the high cost of the power plant, expensive and complete hydrogen sulfide removal facilities of a permanent nature are feasible and are normally provided.

Unfortunately, facilities of the type used for treating large volumes of steam discharged from geothermal steam power plants, and which may, for example, utilize a hydrogen sulfide removal process such as that disclosed in U.S. Pat. No. 4,283,379 to Fenton et al., are not economically adaptable to removing hydrogen sulfide from the relatively much smaller quantities of steam vented in numerous, isolated locations from idle steam wells to prevent condensation damage.

The strict emission standards are usually also applied to hydrogen sulfide emissions in escaping drilling gas and steam during actual geothermal steam well drilling operations. Because processes and apparatus used for power plant hydrogen sulfide abatement have also not been found economically adaptable for well drilling operations, other hydrogen sulfide abatement processes have been developed for this purpose. One such hydrogen sulfide abatement process particularly useful for geothermal steam well drilling operations is disclosed in U.S. Pat. No. 4,151,760 to Woertz. Although the process disclosed by Woertz has been determined to be effective for removing hydrogen sulfide from emissions during steam well drilling operations and to be comparatively economical for this purpose, it is not economically attractive for abating hydrogen sulfide emissions from vented, idle steam wells.

Another method especially directed towards capping or shutting in completed geothermal steam wells during periods of well nonuse, for example, between well completion and connection of the well to an operational geothermal steam electric power plant, is disclosed by Lieffers, et al. in U.S. Pat. 4,407,366. The well is sealed off, preferably at the wellhead, and a gas other than steam is injected into the well at a rate that substantially prevents condensation of geothermal steam in the well during the period of nonuse. The capping gas may be a gas having a molecular weight lower than geothermal steam such as inert helium or one having a higher molecular weight such as inert nitrogen. The disadvantages of this method are that the capping gas is expensive and inconvenient to administer.

In essence, then, the prior techniques for shutting in a geothermal well present no viable options. Either one bears the costs and inconvenience of inert gas capping or one risks carbon dioxide corrosion and/or condensation in the wellbore "killing" the well. Alternatively, one can vent the well if costly methods for removing hydrogen sulfide and other noxious gases from effluents are instituted.

It is, therefore, a major object of this invention to provide an economical, non-hazardous, and non-corrosive method for eliminating venting of geothermal wells under static conditions without causing condensation in the wellbore and subsequent "killing" of the wellbore. Other objects and advantages will become apparent in view of the following description.

SUMMARY OF THE INVENTION

A closed system apparatus connecting between at least two vapor dominated geothermal wells prevents condensation in the wellbores under shut-in conditions, said apparatus comprising a means for preventing accumulation of condensate and non-condensable vapors in the wellbores.

Typically the apparatus comprises a conduit connecting between 2 and about 15 vapor dominated wells, said conduit having means for controlling the flow of geothermal vapors and a continuous flow recorder for recording the flow of vapors therethrough.

BRIEF DESCRIPTION OF THE DRAWING

The invention will be more readily understood by reference to the drawing, which depicts the preferred embodiment of the apparatus for practicing the method of the present invention.

DETAILED DESCRIPTION OF THE INVENTION

Geothermal wells that produce from vapor-dominated reservoirs must be protected from wellbore condensation under static conditions, that is, under conditions where the flow of steam from a completed well has been curtailed or shut-in, as when it is not currently being used to produce energy. It has been found that protecting the wellbore against condensation during periods of shut-in can be achieved by maintaining a continual steam flow to the surface when the well is not under production. The heat content of this steam flow must be adequately large to prevent wellbore condensation from accumulating and "killing" the well. In this invention the steam flow is not vented to the atmosphere, but is circulated in internal flow between two or more geothermal steam wells, preferably nearby wells producing in the same geothermal formation. In this manner wells existing under static conditions can be continually maintained in good steam-producing condition at a minimum expense and without the emission of any atmospheric pollutants.

To accomplish interwell flow under static well conditions, a closed system flow manifold conduit assembly is attached in fluid-tight connection between the production casings of at least two producing geothermal wells. The manifold conduit assembly can be connected between as many wells as is desired, for example, between all of the wells feeding a single turbine or generator in a geothermal power plant (typically between 6 and 15 geothermal wells), so long as the wells so connected are at slightly different production pressures, that is, at slightly different wellhead pressures. A pressure differential across the wells connected in interwell flow by the manifold conduit assembly is essential to the practice of this invention since the differential pressure is what drives steam flow. Typically, even wells drilled into the same formation will be at slightly different wellhead pressures due to reservoir heterogeneities and discontinuities.

The manifold conduit assembly connecting any two geothermal wells comprises a flow manifold conduit of any suitable size and optional flow control valves to control the flow of steam through the manifold conduit. Preferably the manifold conduit has a three inch internal diameter.

To allow for controlling interwell flow between any two of the wells so connected by a manifold conduit, at least one flow control valve, such as a wing valve, is situated along the conduit connecting any two wells. In the preferred embodiment, two such wing valves are situated along the conduit, each located relatively nearby one of the two production casings joined by the manifold conduit.

As illustrated in the drawing, the manifold conduit assembly preferably comprises manifold conduit 2 connecting geothermal Well A and Well B, wing control valves 4 and 6, and continuous flow recorder 8 situated thereon for controlling and recording the flow of geothermal vapors from Well A to Well B. In operation under shut-in conditions, master valves 10 and 12 and back-up master valves 14 and 16 are closed to block the flow of geothermal vapors from the wells to the power plant (not shown) via conduits 18 and 20. Wing control valves 4 and 6 are adjusted to an open position so that a sufficient continuous flow of geothermal vapors traverses conduit 2 from higher-pressured Well A passing into lower-pressured Well B so as to prevent accumulation of condensate and non-condensable vapors in wellheads 22 and 24.

In use, when the valves on the flow conduits connecting two shut-in wells are open, a continuous flow of steam circulates through the manifold conduit assemblies connecting the shut-in geothermal wells driven by differential wellhead pressures between the wells so connected. Steam will continuously flow out of higher-pressure wells into lower-pressure wells, thus preventing wellbore condensation in each of the wells connected by the manifold conduit assembly. The amount of steam flow must be sufficient to prevent accummulation of condensate and non-condensable vapors in all of the wellbores so connected.

In the typical vapor-dominated geothermal field penetrated by producing wellbores the pressure differential across the field can range from 250 to 500 p.s.i. But typically, in the practice of this invention a pressure differential of at least about 2 p.s.i. between the highest pressured well and the lowest pressured well connected by the flow conduits is needed to drive circulation through the interconnected conduits. These pressure differentials result from reservoir heterogeneities and discontinuities caused by the orientation, spacing, and distribution of fractures within the formation.

As an additional benefit, when the shut-in wells have been returned to production status, the manifold conduit, which typically remains in place between the wellbores, can be used to shunt excess flow from one well production casing to another. If one well is significantly larger than another well, the larger well can produce additional steam flow through the connecting manifold conduit.

The preferred apparatus for interwell flow has no moving parts, being composed of only valves and pipe conduits. Further, the apparatus requires no operators, and needs only a minimal amount of maintenance. Although it is most applicable to locations having multiple well sites with common ownership, in the event of dissimilar well ownership, means for measuring the direction and flow of steam through the manifold conduit can be installed along the flow conduit, such as a continuous recording flow meter. In this way, the flow of valuable steam from one owner to another can be monitored so that remuneration can be made.

EXAMPLE 1

A test is conducted for a period of 14 days in which two geothermal wells, Well A and Well B, are shut-in and interwell flow is monitored. The wells are connected by a flow conduit comprising a conduit having a three inch internal diameter, continuous recording flow meter and wing valves located adjacent to each production casing. As is seen in Table I, upon shut-in of the wells the flow as recorded by the continuous recorder is initially in the direction from Well B to Well A and at a rate of about 8000 pounds per hour. Upon the buildup of pressure in Well A under shut-in conditions, the direction of flow reverses on the 2nd day from Well A to Well B, gradually increasing to a rate of 5400 pounds per hour by the 13th day of flow.

TABLE I

| FLOWRATE: WELL A TO WELL B | |
|---|---|
| DAY | FLOWRATE (LB/HR) |
| 1 | −7500 |
| 2 | −750 |
| 3 | 3250 |
| 4 | 4000 |
| 5 | 4250 |
| 6 | 4750 |
| 7 | 4850 |
| 8 | 4950 |

TABLE I-continued

| FLOWRATE: WELL A TO WELL B | |
|---|---|
| DAY | FLOWRATE (LB/HR) |
| 9 | 5000 |
| 10 | 5100 |
| 11 | 5200 |
| 12 | 5300 |
| 13 | 5400 |

This example illustrates that the differential pressure and direction of vapor flow between shut-in wells depends upon the difference in buildup rates characteristic of the particular wells connected in interwell flow. Here, although the wellhead pressure of Well B is greater initially, once the wells are shut-in the greater buildup rate of Well A reverses the flow from Well A to Well B.

It is found that the flow rate resulting from the differential pressure between Well A and Well B is sufficient to prevent accumulation of condensate and non-condensable vapors in the wellbores.

Although the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method for preventing condensation of fluids in the wellbores of geothermal wells penetrating a vapor-dominated geothermal formation under conditions of well shut-in, said method comprising continuously flowing a sufficient interwell flow of geothermal vapors from at least one wellhead at higher pressure into at least one wellhead at lower pressure so as to prevent accumulation of condensate and non-condensable vapors in all the wellheads connected by said interwell flow.

2. The method in claim 1 wherein the pressure in the highest pressured reservoir is at least about 2 p.s.i. higher than the pressure in the lowest pressured reservoir connected in interwell flow.

3. The method in claim 2 wherein between 2 and about 15 shut-in vapor-dominated geothermal wells are connected by the continuous interwell flow.

4. The method of claim 3 wherein the differential pressure across said geothermal formation is between about 250 and 500 p.s.i.

5. The method of claim 1 wherein emission of atmospheric pollutants is minimized and the wellheads connected by said interwell flow are maintained in steam-producing condition.

6. The method of claim 1 wherein the heat content of the interwell flow is sufficiently large to prevent accumulation of the condensate and non-condensable vapors.

7. A method for preventing condensation of fluids in the wellbores of geothermal wells penetrating a vapor-dominated geothermal formation under conditions of well shut-in, said method comprising shutting-in a group of wells fluid-tightly connected together by means for interwell flow so that differential wellhead pressures of at least about 2 p.s.i. drive a continuous flow of geothermal vapors via said means for interwell flow from higher-pressured wellheads to lower-pressured wellheads.

8. The method of claim 7 wherein said group of wells comprises between 2 and about 15 vapor-dominated geothermal wells.

9. The method of claim 7 wherein said vapors flow from one wellhead into another.

10. A method for preventing condensation of fluids in the wellbores of geothermal wells penetrating a vapor-dominated geothermal formation under conditions of well shut-in, said method comprising continously flowing a sufficient interwell flow of geothermal vapors from at least one wellhead at higher pressure into at least one wellhead of lower pressure so as to prevent accumulation of condensate and non-condensable vapors in at least one of the wellheads connected by said interwell flow.

11. The method of claim 10 wherein the pressure in the highest pressured reservoir is at least about 2 p.s.i. higher than the pressure in the lowest pressured reservoir connected in interwell flow.

12. The method of claim 10 wherein between 2 and about 15 shut-in vapor-dominated geothermal wells are connected by the continuous interwell flow.

13. The method of claim 12 wherein the differential pressure across said geothermal formation is between 250 and 500 p.s.i.

14. A method for preventing condensation of fluids in the wellbores of geothermal wells penetrating a vapor-dominated geothermal foundation under conditions of well shut-in, said method comprising shutting-in a group of wells fluid-tightly connected together by means for interwell flow so that differential wellhead pressures of at least about 2 p.s.i. drive a continuous flow of geothermal vapors via said means for interwell flow from at least one higher-pressured wellhead to at least one lower-pressured wellhead.

15. The method of claim 14 wherein the group of wells comprises between 2 and 15 vapor-dominated geothermal wells.

16. The methods of claim 14 wherein the vapors flow from at least one wellhead into at least one other wellhead.

17. The method of claim 14 wherein emission of atmospheric pollutants is minimized.

18. The method of claim 14 wherein said wellheads connected by said interwell flow are maintained in steam-producing condition.

19. The method of claim 14 wherein the heat content of the interwell flow is sufficiently large to prevent accumulation of the condensate and non-condensable vapors.

* * * * *